Dec. 12, 1961 J. P. RENSHAW 3,012,551
ROTARY ENGINE

Filed Feb. 24, 1960 5 Sheets-Sheet 1

INVENTOR.
JOHN P. RENSHAW
BY
*Townsend and Townsend*
ATTORNEYS

INVENTOR.
JOHN P. RENSHAW
BY
Townsend and Townsend
ATTORNEYS

Dec. 12, 1961  J. P. RENSHAW  3,012,551
ROTARY ENGINE
Filed Feb. 24, 1960  5 Sheets-Sheet 3

INVENTOR.
JOHN P. RENSHAW
BY
Townsend and Townsend
ATTORNEYS

INVENTOR.
JOHN P. RENSHAW
BY
Townsend and Townsend
ATTORNEYS

United States Patent Office 3,012,551
Patented Dec. 12, 1961

3,012,551
ROTARY ENGINE
John P. Renshaw, 340 Pine St., San Francisco, Calif.
Filed Feb. 24, 1960, Ser. No. 10,601
15 Claims. (Cl. 123—13)

This invention relates to a rotary type internal combustion engine.

Various engines of the rotary type have been devised generally including a power disk contained within a housing with the provision of combustion areas formed by cut out portions of the disk in which are created expansive gas charges to cause the power disk to rotate. Such systems generally comprise a valve wheel or disk which rotates in precise time synchronization with the power disk in a manner which will cause an injection of combustible charge into the combustion chamber and a wall within the combustion chamber against which the expansive gas can react to cause the forward movement of the power disk.

This invention relates to improvements in the aforesaid type of engine and has as its principal object the provision of a direct gear linkage between the power and the valving disks which is contained entirely on the periphery of the two disks in such a way as to render errors in timing impossible.

A feature and advantage of this invention is that the direct geared relationship of the power and the valving disks forms a more complete gas seal between the disks and further eliminates the need of all external gears so that by application of this new principal the engine may include in addition to the power disk only one moving part for each combustion station.

Another object of this invention is to provide in combination with the gears, dirt traps in areas in the housing which are arranged to receive dirt, grit, carbon or other undesirable materials which may accumulate between the gear teeth thus rendering facilities which eliminate harmful materials.

A further object of this invention is to provide in the valving disk a unique gas feed back system in which the valving disk is provided with two rotating gas compression chambers or areas and a feed back loop which allows the residual compressed charge remaining in the compression area, after the basic charge has been transferred to the power disk combustion chamber, to be transferred to the other compression area. By this means substantially all of the compressed charge is utilized.

A still further object of this invention is to provide a novel configuration for the inter-related faces of the power disk and valving disk which provides for the mutual transfer of the two disks within the combustion and compression areas in such a way as to prevent gas transfer from the chambers and further allows the transfer faces to be spaced sufficiently far apart to allow for more than minimal tolerance during operation. This constitutes an important advantage in the improved engine in that it allows the engine to be operated at high speeds without the danger of any two transfer surfaces making contact.

The spacing between the transfer surfaces and the two disks also is extremely important in that the spacing allows for greater errors to be tolerated in the meshing or spacing between gear teeth. The spacing also provides an area in which any increase in size of the disks due to thermal expansion is absorbed. It is also believed obvious that the wider tolerant spacings between the transfer surfaces is of extreme importance after the gears have been substantially worn.

Still a further object of this invention is to provide a novel gas transfer system which will allow the compressed gas from the valving disk to be stored under compression within a gas transfer manifold and released from the manifold into the firing chamber at the proper time.

The novel valving arrangement comprises a groove formed in the valving disk which is in communication with the compression chamber and an opening from the compression manifold registered with the groove so that gas transfer can occur from the compression chamber into the compression manifold only during intervals when the groove and the opening to the compression manifold are in registration. This feature allows for precise integral timing and requires no moving parts except the disks themselves.

A further feature and advantage of this invention is that the principles of the engine may be employed in a pump or compressor by driving the device from an external source of power so that the basic principles of this invention are well suited to various forms of power generation such as in the operation of a motor or as a pump or compressor.

Other objects of the present invention will become apparent upon reading the following specification and referring to the accompanying drawings in which similar characters of reference represent corresponding parts in each of the several views.

In the drawings:

FIGS. 2a, 2b and 2c together comprise an exploded view of the invention in which

The principal embodiment of the invention is shown as comprising a single power disk engine having three fixed firing stations. Such a relationship has been selected solely for purposes of convenience it being clearly understood that the system is equally well applicable to motors having multiple firing and/or valving disks with virtually any selected number of firing and/or valving areas.

In the principal embodiment of this invention there is provided a main power disk housing A having a power disk B rotatably mounted within the housing. The disk is rotatably supported by bearings 20 mounted on housing A which rotatably supports the power disk shaft 21.

Three valve disk housings each being identical one to the other identified by the letter C and otherwise bearing identical reference numerals for identical parts, are mounted at equally spaced intervals about power disk housing A.

Each valve disk housing contains a valve disk D which is rotatably supported by bearings 23 which rotatably support the valve disk shaft 24.

Power disk B is formed with two outer radii segments 26 and 27 bearing, on the peripheral edge, gear teeth indicated at 29. The inside wall of housing A is formed to provide a precision mating of the top wall 31, bottom wall 32 and side wall 33 with the top face 35 and the bottom face 36 and the outer edge of gear teeth 29 respectively.

The mating engagement between the inside wall of the housing and the power disk forms a substantially air tight seal between the various members but having sufficiently loose contact to allow for the free rotation of the power disk or wheel. The power disk is also formed with two areas 38 and 39 of reduced diameter on opposite sides of the disk between the enlarged diameter portions 26 and 27. The reduced diameter areas 38 and 39 are formed on their outer peripheral faces with gear teeth 40 which are of the same pitch as gear teeth 29. The areas between outer radii segments 26 and 27 and the inside walls of housing A form an area within the disk herein designated as E in which the combustion will occur. This area is hereinafter related to the combustion chamber as will be hereinafter described and will be designated as E.

Valve disk D is similarly formed with a pair of oppositely facing large diameter sections 41 and 42 with corresponding smaller diameter sections 43 and 44 on opposite sides of the valving disk between the enlarged diameter sections 41 and 42. The outer face of enlarged sections 41 and 42 is provided with gear teeth indicated at 45 and the inner section is provided with similar gear teeth 46 of identical pitch. The axes of rotation of the disks D and E are placed normal to one another with the respective gears 29 and 40 of the power disk B being engaged with the teeth 46 and 45 of valving disk D. The two disks are timed so that there is a mating of gear teeth 40 with gear teeth 45 and sequentially the mating of gear teeth 29 with gear teeth 46. By the inter-locking of the two gears there is created a sequential transfer of the enlarged areas 41 and 42 with the reduced diameter sections 38 and 39 and the concurrent transfer of the smaller areas 43 and 44 of the valve disk with the larger areas 26 and 27 of the power disk.

Housing C is formed with the opposite side wall 50 and the inside end wall 51 being in mating engagement with the opposite sides and gear teeth 45 to disk D to form a completely air tight seal between the valve disk to hold the volume of air or other gases in the compression area hereinafter indicated at F, in the spaces between enlarged sections 41 and 42.

A spark plug 53 is mounted in housing A slightly forward of each valve disk D. The spark gaps 54 of the plug are positioned within a plurality of gas transfer ports 55 formed in wall 32 of housing A. Ports 55 are of sufficient depth to provide clearance between power disk B and the plug. Transfer ports 55 also function to emit gas under charge into compression chamber E as will be hereinafter described.

The engine of this invention takes in a charge of gasoline or other combustible fuel and air through an intake manifold 58 which has its point of entry into housing C slightly above the joinder of housing C with housing A. Air and gas is drawn into compression area F of valve disk D as area F moves past the intake manifold. If desired the gas and air mixture may be forced into the compression area under pressure with a conventional supercharging or other similar type apparatus.

It is also believed apparent that the device could be operated as a diesel engine by establishing the proper compression ratio and removing the spark plug or the device may be operated by having a separate air intake and gas intake. In such a device the gas may be injected directly as a stream into the compression area.

Figure 4:
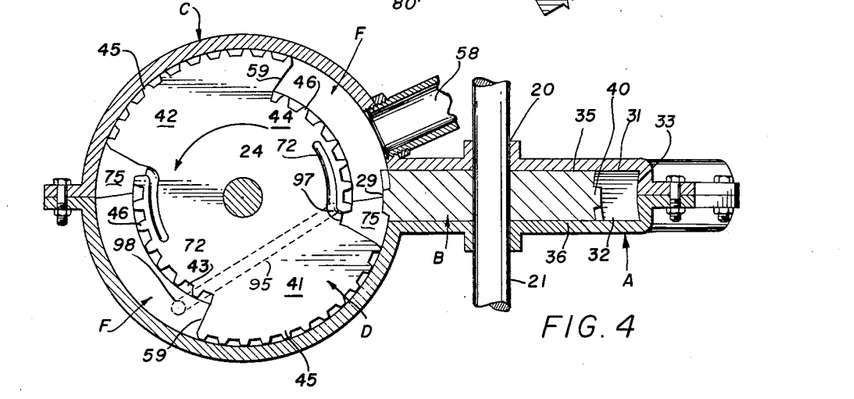
FIG. 4 is a similar view to FIG. 3 showing the plane of the valving disk and the cross-section of the power disk.
Figure 5:
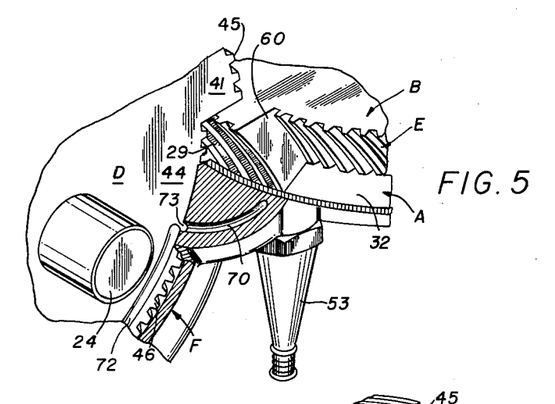
FIG. 5 is a fragmentary perspective view showing the inter-relationship of the power disk and the valving disk during the timing phase when there is communication between the compression chamber and the compression manifold.
Figure 6:
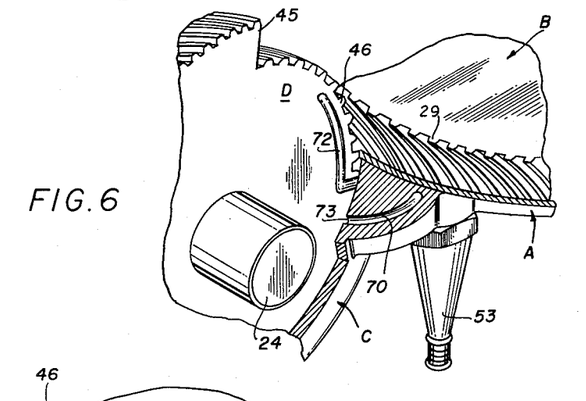
FIG. 6 is a similar view to FIG. 5 but showing a phase of operation when the gas charge is held captive within the compression manifold.
Figure 7:
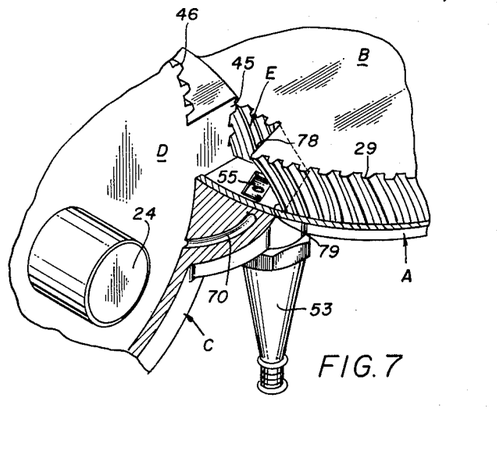
FIG. 7 is a view similar to FIGS. 5 and 6 showing the phase of operation immediately subsequent to ignition during which time there is fluid communication from the compression manifold to the firing chamber.
Figure 8:
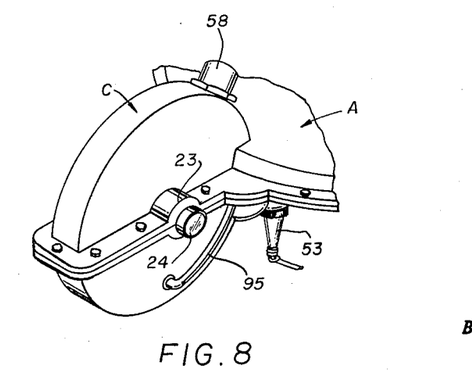
FIG. 8 is a perspective view showing the feed back loop for the residual charge.
Figure 10:
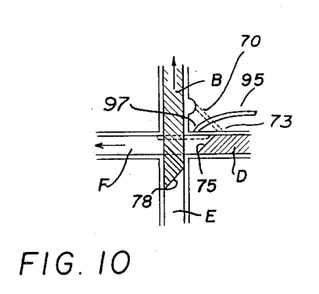
FIG. 10 is a schematic view showing the inter-relationship of the power and the valving disk during the phase of operation immediately prior to residual feed back of gas to an alternate compression area.
Figures 11, 13:
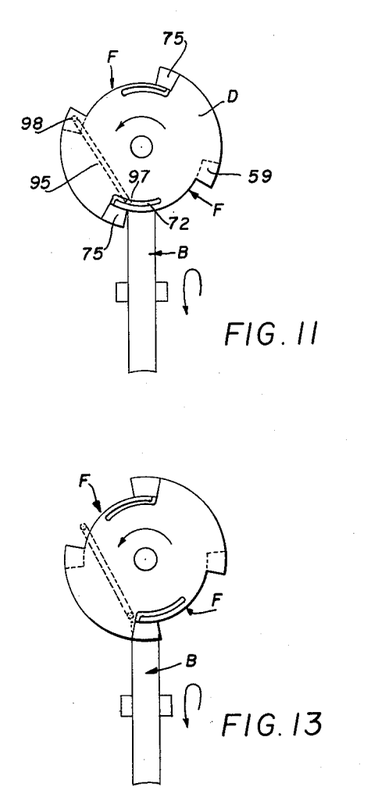
FIG. 11 is a diagrammatical view similar to FIG. 10.
FIG. 13 is a diagrammatic view similar to FIG. 12.
Figure 12:
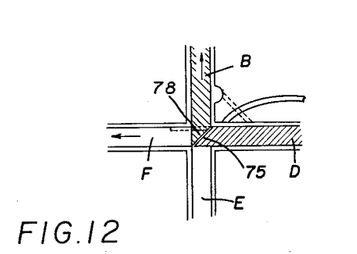
FIG. 12 is a schematic view showing the transfer of faces of the driving and valving disks or wheels subsequent to feedback of gas.
Figure 14:
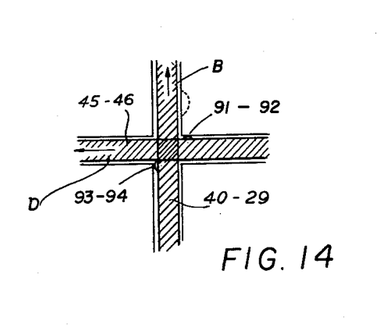
FIG. 14 is a schematic view showing the relative location of the dirt and grit traps to show how they relate to the pitch of the respective gears.

The charge within area F is then rotated in a counter-clockwise direction as viewed in FIG. 4. When compression area F moves to a point where the leading edge or transfer surface 59 of the compression area F is coincident with power disk B there is a timed mating of transfer surface 60 of power disk B. Transfer surface 60 comprises the trailing edge of each combustion chamber E. During this interval the larger radii segments 26 and 27 of disk B form an abutment in compression chamber F so that continued rotation of disk D causes a diminishing of the area within the compression chamber and the concurrent compression of gas within the area.

A compression manifold indicated at 70 is provided in communication to gas transfer port 55 and the side wall of disk D. Disk D is provided with a groove 72 in fluid communication with compression area F and formed in alignment with the open end 73 of the compression manifold. The groove is positioned so that the groove will mate in alignment with end 73 subsequent to the enlarged radii segments 26 and 27 of power disk B being aligned over gas transfer ports 55. When the outer diameter portions of power disks are aligned over gas transfer ports 55 all fluid communication from compression manifold 70 is blocked. During this phase of operation the gas within compression area F is forced into compression manifold 70.

As the valving disk D further advances, transfer surface 75 on the trailing edge of compression area F interchanges with leading transfer surface 78 on the leading edge of combustion chamber E. In this phase of operation groove 72 has passed port 73 so that the end 73 is blocked and the compressed gas charge is held captive within manifold 70. The enlarged diameter sections 41 and 42 of the valving disk thereafter enter combustion chamber E to form an abutment against which the subsequent expansion of gas within the combustion chamber can react after ignition of the gas within the combustion chamber.

With the subsequent advance of the power disk B the bottom edge 79 of the leading transfer surface 78 passes over gas transfer ports 55 thus allowing the captive gas within manifold 70 to be released into combustion chamber E.

An electrical timing device, not shown, of the type conventionally employed for ignition timing, is arranged to charge spark plug 53 to cause an ignition spark across spark gap 54. This creates an explosion within combustion chamber E and the concurrent expansion of gas reacts against the face of disk D and transfer surface 78 of power disk B to cause the forced rotation of the power disk. After combustion the exhaust gases are removed from the combustion chamber E through a exhaust manifold 80. The exhaust manifold is arranged to exhaust gas under compression due to the fact that the next disk D is timed to have its larger diameter sections 41 or 42 within the combustion chamber E of the power disk so that the trailing transfer surface 60 acts against the next disk D to expel exhaust gas from combustion chamber E.

The opening for the exhaust manifold or port 80 is arranged sufficiently in advance of the combustion area so that the edges of gear teeth 29 of the power disk B act to valve the exhaust manifold closed until such time as full advantage has been taken of the power charge.

It can thus be seen that the sequence of operation that the greater diameter sections of the respective disks B and D sequentially exchange with the small diameter sections in such a way as to employ the side walls of the enlarged portions of the respective disks as abutments against which compression and power can be manifested.

The gear teeth on the peripheral edges of each pair of disks are aligned, pitched and mated so that there is a continual transfer of relative drive between each pair of disks. This is accomplished by having overlapping gear relationships at the transfer surfaces. It can thus be seen that the gear provides the feature of completely integral timing between the respective disks so that it is virtually impossible to obtain timing errors.

The respective transfer surfaces 60 and 78 of disk B and their respective mating transfer surfaces 59 and 75 of disk D may be provided with considerable tolerance between the two at the time of transfer. This is due to the fact that the timing and valving relationships between the two disks or wheels are such that at the moment of transfer there is no appreciable compression or power activity.

The gear teeth are each formed in a concave structure having a radius coincident with the mating radius of the opposite disks area which the gear teeth are to engage in order to take full advantage of the inter-related gear faces. Thus gear teeth 29 and 40 each have respective radii equal to the radius of the opposite wheels at their mating positions and gear teeth 45 and 46 are similarly formed.

It is recognized that from time to time carbon, dirt or grit will accumulate between the gear teeth. In order to remove the dirt and grit, traps 90 and 91 are provided on top wall 31 adjacent the opening at the joinder of housings A and C. The trap 90 is aligned with the outer gear teeth 29 and the trap 91 is aligned with gear teeth 40 of power disk B and the bottom wall 32 of housing A is provided with similar traps 92 and 93 aligned respectively with the gear teeth 45 and 46. The traps are located in a position so that the force of the action of the gear teeth of disk D will bring dirt and grit into the traps 92 and 93. By this means dirt and grit then may have a tendency to be created by the inter-action of the gear or nondisposed fuel materials which can find their way from inter-action with the gear teeth. The action of the gear teeth mating with each other creates a migratory effect on dirt and grit into the respective dirt and grit traps 90, 91, 92 and 93.

As an additional feature of the invention a feed back loop pipe 95 is arranged to provide a return of the charge remaining in the compression area F subsequent to the time that the compression manifold is valved closed to the compression area. The function of the return or feed back pipe 95 is to allow the residual gas and air charge to be fed back to the compression area on the opposite side of valving disk D.

The feed back loop, as can best be seen with reference to FIGS. 10, 11, 12, 13 and 4, is that just prior to the transfer of transfer surfaces 75 and 78 and after the communication between the compression area and compression manifold is closed there is still residual charge remaining in the compression area. During this phase of operation the charge is by means of the feed end 97 of feed back pipe 95 registered with groove 72 so that the charge within compression area F is directed into the feed back pipe 95. The opposite end 98 of pipe 95 opens directly into the opposite compression area F of wheel or disk D so that there is fluid transfer to the opposite compression area. This effect can be seen with reference particularly to FIGS. 10 and 11 wherein it is seen that prior to the transfer of transfer surfaces 78 and 75 the compressed air between surface 75 and disk B is communicated through the groove 72 into pipe 95 and the opposite chamber F. The opening 98 of pipe 95 is positioned so that communication from end 98 is only allowed into the opposite chamber F when the compression chamber is moved to a point where there is no more communication between end 73 of manifold 70 and groove 72. At the time of actual transfer by the surfaces 75 and 78 of the respective disks, end 97 of pipe 95 comes out of registry with groove 72.

The feed back loop also may be employed with a compression disk D having only a single cut out area. To accomplish this function the disk would be arranged to block fluid communication from the discharge end of the tube during the time that the tube is receiving the residual charge from the compression area wherein the tube would function to store the residual charge until such time as the discharge end of the tube is registered with the compression area.

Figure 1:
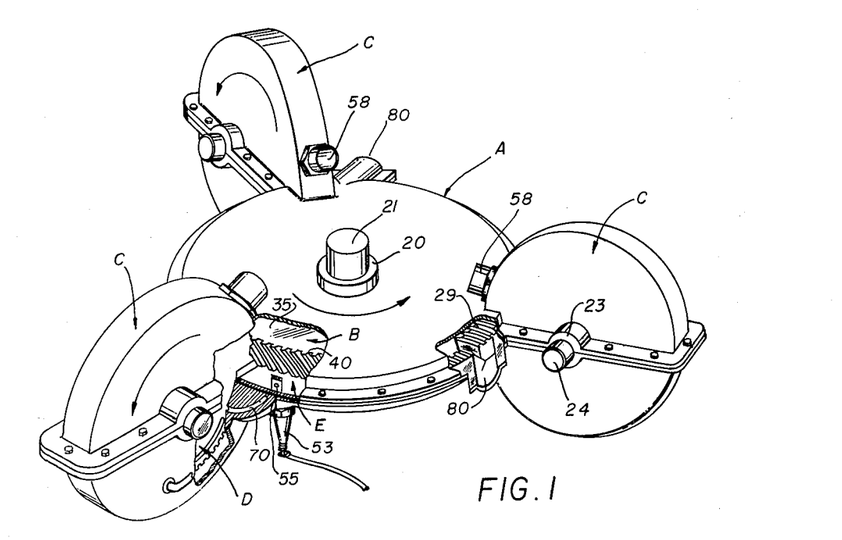
FIG. 1 is a perspective view showing the housing with portions cut away to show the inner structure of the working parts.
Figure 2A:
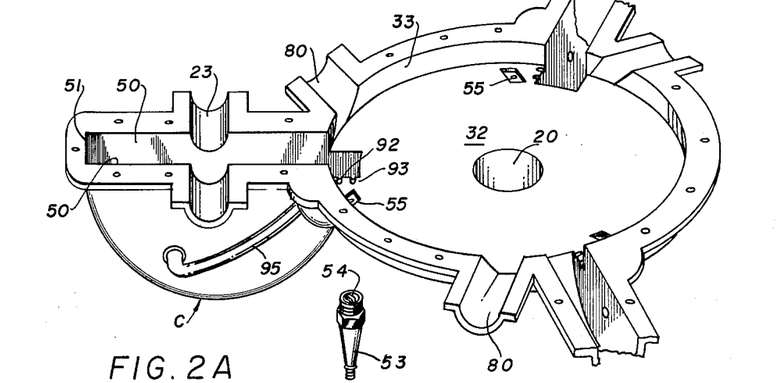
FIG. 2a shows the bottom half of the housing.
Figure 2B:
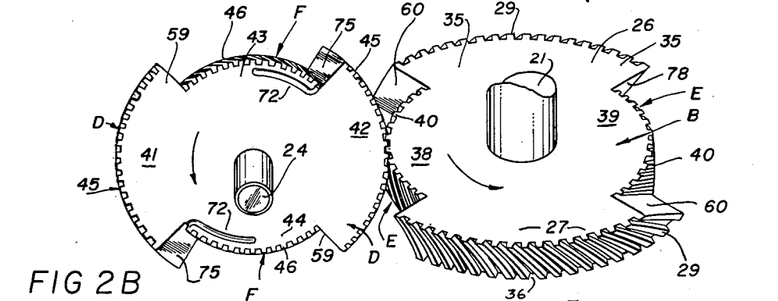
FIG. 2b shows the power and the valve gear.
Figure 2C:
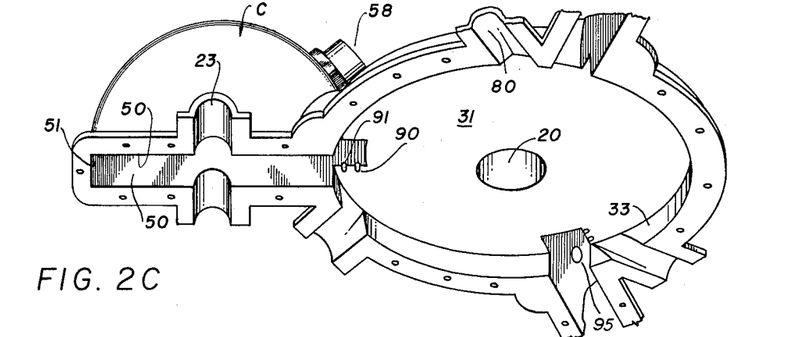
FIG. 2c shows the upper half of the housing.
Figure 3:
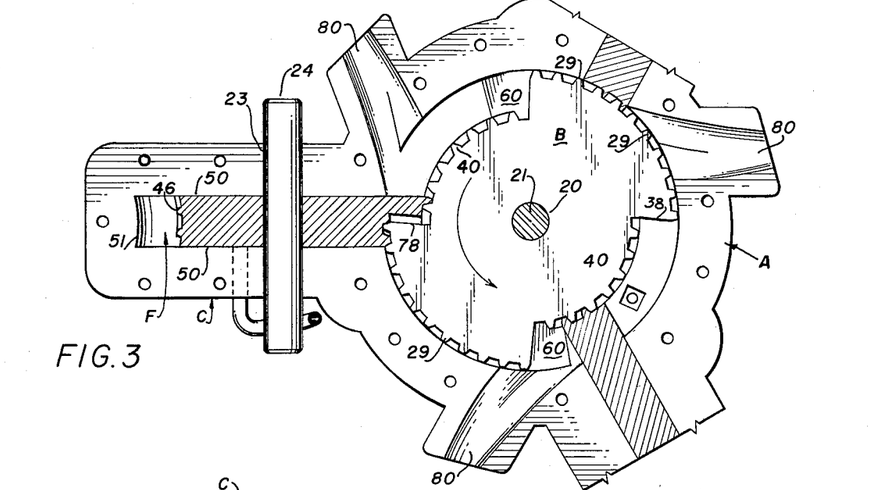
FIG. 3 is a cross-sectional view showing a top plane of the power disk and a cross-section of the valving disk.

In operating the device gas and air mixture is supplied to intake manifold 58. The air and gas mixture is taken into compression area F of disks D when the disks are in the phase of operation as indicated in FIGS. 3 and 4.

Disk D continues to rotate while a larger diameter section of power disk B forms an abutment against which compression area F can compress air and gas. During the build up of pressure and after port 55 has been closed by disk B, groove 72 is brought into fluid communication with compression manifold 70 to transfer the built up gas pressure into the manifold. After the charge has been built up fluid communication is closed to the manifold where the gas charge is held captive within the manifold. Subsequent to this phase there is a feed back of the compression existing in compression area F to the opposite chamber for the next cyclic phase of operation. This is done by bringing groove 72 in communication with feed back pipe 95 and opening the opposite end of feed back pipe 95 into the opposite compression area.

Disk B is then moved to a point where fluid communication is established between transfer port 55 into combustion chamber E. After the charge has been transferred to the firing chamber, spark plug 53 is ignited and the explosion causes the continued power rotation of the power disk B. The power disk rotates to a point where the firing chamber is open to exhaust manifold 80. Previously the next succeeding disk D has interchanged to form an abutment against which the exhaust gases are compressed and emitted forcefully from the firing area.

The dirt and grit that collects among the gear teeth is forced into the respective collection ports 90, 91, 92 and 93 during all the operation. Dirt, grit and carbon from port 93 escapes into combustion area E, dirt from port 92 escapes into compression area F, and dirt from ports 90 and 91 escapes into exhaust port 80.

While the principal embodiment has been described as being an engine it is believed obvious that an external source of power may be connected to shaft 21 so as to cause the power disk to be rotated in which event the device would function as a pump wherein air or other gas is forced from exhaust manifold 80. If the device is being used as a pump it is believed obvious that the part of the device which is used as an engine such as the spark plug and other similar parts can be removed and some of the other portions of the machine which are directed toward the input of fuel and the like can similarly be removed or modified so that the device would function more effectively as a pump or compressor.

It is also believed apparent that the principles of the subject device may be used as a diesel engine by establishing a proper compression ratio and eliminating the spark plugs.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. In a power generating device of the type having an enclosed chamber containing at least two disks rotatable in different planes in which each disk has an enlarged radius section and a reduced radius section the improvement comprising: gear teeth on the edge of each said disk; said gear teeth on each said disk being mated to allow each disk to drive the other to rotate throughout 360° and proportioned to time the larger radius section of each disk to synchronously mate with the smaller radius section of the other disk.

2. In a power generating device of the type having an enclosed chamber containing at least two disks rotatable in different planes in which each disk has an enlarged radius section and a reduced radius section the improvement comprising: gear teeth on the edge of each said disk; said gear teeth on each said disk being mated to allow each disk to drive the other to rotate throughout 360° and proportioned to time the larger radius section of each disk to synchronously mate with the smaller radius section of the other disk; and apertures mounted within the chamber adjacent the edges of said gear teeth to receive particles which may be lodged between said gear teeth.

3. In a rotary engine of the type having a power disk and a valving disk each rotatable in different planes in which each disk has an enlarged radius section and a reduced radius section wherein the reduced radius section of the power disk forms a combustion chamber and the enlarged diameter section of the valving disk forms an abutment against which expansive gas will cause the power disk to rotate and the cut out portion of the valving disk forms a compression chamber which reacts against the enlarged diameter section of the power disk to compress gas for transference to the compression chamber the improvement comprising: gear teeth formed on the edge of the power disk; and gear teeth formed on the edge of the valving disk; said valving disk gear teeth and said power disk gear teeth being mated to allow said disks to be interdriven.

4. In a rotary engine of the type having a power disk and a valving disk each rotatable in different planes in which each disk has an enlarged radius section and a reduced radius section wherein the reduced radius section of the power disk forms a combustion chamber and the enlarged diameter section of the valving disk forms an abutment against which expansive gas will cause the power disk to rotate and the cut out portion of the valving disk forms a compression chamber which reacts against the enlarged diameter section of the power disk to compress gas for transference to the compression chamber the improvement comprising: said power disk and said valving disk each being formed with peripheral mating gear teeth to cause said disks to be interdriven; said gear teeth being relatively proportioned to time the larger radius section of each disk to synchronously mate with the smaller radius section of the other disk.

5. In a rotary engine of the type having a power disk and a valving disk each rotatable in different planes in which each disk has an enlarged radius section and a reduced radius section wherein the reduced radius section of the power disk forms a combustion chamber and the enlarged diameter section of the valving disk forms an abutment against which expansive gas will cause the power disk to rotate and the cut out portion of the valving disk forms a compression chamber which reacts against the enlarged diameter section of the power disk to compress gas the improvement comprising: a compression manifold; one end of said manifold opening against the face of said power disk and in alignment with the enlarged radius section of said power disk wherein the enlarged section of said power disk causes a fluid tight seal while said enlarged section is aligned with the end of said manifold; and a groove formed on one face of said valving disk; said groove opening to the edge of the reduced diameter section of said valving disk; the opposite end of said manifold being aligned to register in fluid communication with said groove when said valving disk is compressing gas within the compression chamber.

6. In a rotary engine of the type having a power disk and a valving disk each rotatable in different planes in which each disk has an enlarged radius section and a reduced radius section wherein the reduced radius section of the power disk forms a combustion chamber and the enlarged diameter section of the valving disk forms an abutment against which expansive gas will cause the power disk to rotate and the cut out portion of the valving disk forms a compression chamber which reacts against the enlarged diameter section of the power disk to compress gas the improvement comprising: a compression manifold; one end of said manifold opening against the face of said power disk and in alignment with the enlarged radius section of said power disk wherein the enlarged section of said power disk causes a fluid tight seal while said enlarged section is aligned with the end of said manifold; and a grove formed on one face of said valving disk; said groove opening to the edge of the reduced diameter section of said valving disk; the opposite end of said manifold being aligned to register in fluid communication with said groove when said valving disk is compressing gas within the compression chamber; the two ends of said manifold being positioned relative to the power disk to allow the enlarged radius section of said power disk to open the manifold to the combustion chamber subsequent to the groove being moved out of fluid communication with said manifold.

7. In a rotary engine of the type having a power disk and a valving disk each rotatable in different planes in which each disk has an enlarged radius section and a reduced radius section wherein the reduced radius section of the power disk forms a combustion chamber and the enlarged diameter section of the valving disk forms an abutment against which expansive gas will cause the power disk to rotate and the cut out portion of the valving disk forms a compression chamber which reacts against the enlarged diameter section of the power disk to compress gas the improvement comprising: a compression manifold; one end of said manifold opening against the face of said power disk and in alignment with the enlarged radius section of said power disk wherein the enlarged section of said power disk causes a fluid tight seal while said enlarged section is aligned with the end of said manifold; and a groove formed on one face of said valving disk; said groove opening to the edge of the reduced diameter section of said valving disk; the opposite end of said manifold being aligned to register in fluid communication with said groove when said valving disk is compressing gas within the compression chamber; the two ends of said manifold being positioned relative to the power disk to allow the enlarged radius section of said power disk to open the manifold to the combustion chamber subsequent to the groove being moved out of fluid communication with said manifold; the peripheral edge of each said disk being formed with gear teeth; the gear teeth of each disk being mated to cause the valving disk to move in precise timed relationship with said power disk.

8. In a rotary engine of the type having a power disk and a valving disk each rotatable in different planes in which each disk has an enlarged radius section and a reduced radius section wherein the reduced radius section of the power disk forms a combustion chamber and the enlarged diameter section of the valving disk forms an abutment against which expansive gas will cause the power disk to rotate and the cut out portion of the valving disk forms a compression chamber which reacts against the enlarged diameter section of the power disk to compress gas the improvement comprising: the outer edge of both the enlarged radius section and the reduced radius section of each of said disks being formed with gear teeth; the gear teeth of each said disk being mated to cause the disks to drive each other through 360° of rotation; a compression manifold; means to establish and block fluid communication from said compression chamber to said compression manifold; and means to establish and block fluid communication from said compression manifold to said combustion chamber; said disks timed to cause fluid communication from said compression chamber to said compression manifold when fluid communication is blocked from said compression manifold to said combustion chamber and to establish fluid communication from said compression manifold to said combustion chamber when fluid communication from said compression chamber is blocked to said compression manifold.

9. In a rotary engine of the type having a power disk and a valving disk each rotatable in different planes in which each disk has an enlarged radius section and a reduced radius section wherein the reduced radius section of the power disk forms a combustion chamber and the enlarged diameter section of the valving disk forms an abutment against which expansive gas will cause the power disk to rotate and the cut out portion of the valving disk forms a compression chamber which reacts against the enlarged diameter section of the power disk to compress gas the improvement comprising: the outer edge of both the enlarged radius section and the reduced radius section of each of said disks being formed with gear teeth; the gear teeth of each said disk being mated to cause the disks to drive each other through 360° of rotation; and dirt traps formed adjacent the edge of the gear teeth on both the inner and the outer radius sections of each of said disks; said dirt traps being comprised of apertures aligned with the edge of the gear teeth.

10. In a rotary engine of the type having a power disk and a valving disk each rotatable in different planes in which each disk has an enlarged radius section and a reduced radius section wherein the reduced radius section of the power disk forms a combustion chamber and the enlarged diameter section of the valving disk forms an abutment against which expansive gas will cause the power disk to rotate and the cut out portion of the valving disk forms a compression chamber which reacts against the enlarged diameter section of the power disk to compress gas the improvement comprising: the outer edge of both the enlarged radius section and the reduced radius section of each of said disks being formed with gear teeth; the gear teeth of each said disk being mated to cause the disks to drive each other through 360° of rotation; means to transfer gas from said compression chamber to said combustion chamber during a first phase of operation and to block transference of gas from said compression chamber to said combustion chamber during a second phase of operation; and means to receive gas from said first compression chamber during said second phase of operation; said gas receiving means being operable to subsequently transfer the gas to said compression chamber prior to the repetition of said first phase of operation.

11. In a rotary engine of the type having a power disk and a valving disk each rotatable in different planes in which each disk has an enlarged radius section and a reduced radius section wherein the reduced radius section of the power disk forms a combustion chamber and the enlarged diameter section of the valving disk forms an abutment against which expansive gas will cause the power disk to rotate and the cut out portion of the valving disk forms a compression chamber which reacts against the enlarged diameter section of the power disk to compress gas the improvement comprising: the outer edge of both the enlarged radius section and the reduced radius section of each of said disks being formed with gear teeth; the gear teeth of each said disk being mated to cause the disks to drive each other through 360° of rotation; each said valving disk having at least two reduced diameter sections; means to transfer gas from a first of said compression chambers to said combustion chamber during a first phase of operation and to block the transference of gas from said compression chamber to said combustion chamber during a second phase of operation; and means to transfer gas from said first compression chamber to said second compression chamber during said second phase of operation.

12. In a rotary engine of the type having a power disk and a valving disk each rotatable in different planes in which each disk has an enlarged radius section and a reduced radius section wherein the reduced radius section of the power disk forms a combustion chamber and the enlarged diameter section of the valving disk forms an abutment against which expansive gas will cause the power disk to rotate and the cut out portion of the valving disk forms a compression chamber which reacts against the enlarged diameter section of the power disk to compress gas the improvement comprising: means to interdrive said power and valving disks in timed relationship; a manifold opening to the side wall of said valving disk; and a groove in said valving disk opening to said compression chamber and timed to register with said manifold during a predetermined time phase of operation; the opposite end of said manifold opening to the face of said power disk and registered to provide an opening to the combustion chamber when the power disk moves to a second predetermined position.

13. In a rotary engine of the type having a power disk provided with at least one cut out portion having a reduced diameter to form a combustion chamber and having a valving disk provided with an area of enlarged diameter portion operable to enter the combustion chamber to form an abutment against which combustion and expansive gas will cause the power disk to rotate and a cut out portion which will react against an abutment formed by the power disk to form compression for transference to the combustion chamber the improvement comprising: means to interdrive said power and valving disks in timed relationship; a manifold opening to the side wall of said valving disk; a groove in said valving disk opening to said compression chamber and timed to register with said manifold during a first phase of operation; the opposite end of said manifold opening to a side face of the larger radius section of said power disk and registered to provide an opening to the combustion chamber when the power disk moves to a second phase of operation; said valving disk being formed with at least two compression chambers; a pipe in fluid communication with said groove; and the second end of said tube opening to the second compression chamber to transfer residual compression charge from the first compression manifold to the second manifold.

14. A device according to claim 13 and wherein the second end of said pipe is aligned with the larger diameter radius section of the valving disk at a position to open fluid communication to the second compression chamber during a third phase of operation occurring after said groove is out of communication with said manifold and during the time interval that the gas in the first compression chamber is being compressed against the abutment formed by said power disk.

15. In a rotary engine of the type having a power disk provided with at least one cut out portion having a reduced diameter to form a combustion chamber and having a valving disk provided with an area of enlarged diameter portion operable to enter the combustion chamber to form an abutment against which combustion and expansive gas will cause the power disk to rotate; said power disk having an enlarged diameter section and said valving disk having a reduced diameter section into which the large diameter section of the power disk forms an abutment against which the cut out portion of the compression disk can act to compress gas for transference to the combustion chamber the improvement comprising: the outer edge of said disks being formed with mating gears to cause timed movement of said disks; a housing encasing said disks and forming air tight chambers for said combustion and compression chambers; and grit traps mounted adjacent the edge of the teeth of each gear in said housing to receive grit accumulation from said gears.

References Cited in the file of this patent

UNITED STATES PATENTS

| 178,829 | Fitts | June 13, 1876 |
| 2,674,982 | McCall | Apr. 13, 1954 |

FOREIGN PATENTS

| 3,431 | Great Britain | A. D. 1909 |